UNITED STATES PATENT OFFICE.

CONNORD O. STINEBAUGH, OF SEATTLE, WASHINGTON.

MATERIAL FOR AUTOMOBILE BRAKE-SHOES.

1,076,325.     Specification of Letters Patent.     Patented Oct. 21, 1913.

No Drawing.     Application filed March 8, 1912. Serial No. 682,539.

*To all whom it may concern:*

Be it known that I, CONNORD O. STINEBAUGH, a citizen of the United States, residing at Seattle, in the county of King and State of Washington, have invented certain new and useful Improvements in Material for Automobile Brake-Shoes; and I do hereby declare the following to be a full, clear, and exact description of the invention, such as will enable others skilled in the art to which it appertains to make and use the same.

This invention relates to friction material and has especial reference to friction materials adapted for automobile brake shoes and has for an object to provide a material exerting a great degree of friction against metal without cutting the metal and presenting improved wearing qualities.

A further object of the invention is to provide a friction material for the purposes just above named which is produced in plastic form capable of being molded to the form required for the brake shoe or other similar purposes so that the molded material may be applied directly to the brake without dressing or reducing the size or shape in any manner.

With these and other objects in view the invention consists of compounding the various elements mentioned hereinafter and in the various steps employed in the compounding of such elements, as will be hereinafter described and claimed.

In carrying into effect the present invention I take four quarts of wood charcoal reduced to small granular condition but not pulverized, four quarts of dry Portland cement, four quarts of pulverized plaster of Paris, and from two to ten ounces of pulverized graphite. These ingredients I mix together in dry condition, the amount of graphite employed varying according to the degree of smoothness or friction desired or required from the friction material.

I now take one gallon of kine blood and mix therewith two fluid ounces of sulfuric acid which is stirred and agitated until the meaty substances of the blood are cut and disintegrated by the sulfuric acid. The liquid is then decanted and strained and such strained liquid added to the previously mixed dry powdered composition, the moisture of such liquid being sufficient to produce when mixed a plastic cement composition capable of being molded into any desired form. The composition in such plastic condition is then introduced into any predetermined molds or presses to produce the required or desired shapes and when crystallized, dried and hardened the molded material is found to present excellent wearing qualities, in fact outwearing any known metal, and also has the property of producing a great degree of friction applied to a metallic surface without the disadvantage of producing great wear upon the metal surface to which it is applied.

I claim:—

1. A composition of matter formed by mixing together approximately in the proportions specified, four quarts of powdered charcoal, four quarts of Portland cement, four quarts of plaster of Paris, powdered graphite, and adding to the mixture approximately one gallon of blood and allowing the same to set substantially as described.

2. A composition of matter formed by mixing together approximately in the proportions specified, four quarts of powdered charcoal, four quarts of Portland cement, four quarts of plaster of Paris, from two to ten ounces of pulverized graphite, and adding to the mixture approximately one gallon of blood free from meaty substances, and allowing the same to set, substantially as described.

In testimony whereof I affix my signature in presence of two witnesses.

CONNORD O. STINEBAUGH.

Witnesses:
   S. WARD KEMP,
   ED M. BAYLISS.

---

Copies of this patent may be obtained for five cents each, by addressing the "Commissioner of Patents, Washington, D. C."